(12) United States Patent
Jarvis

(10) Patent No.: US 7,687,099 B2
(45) Date of Patent: Mar. 30, 2010

(54) SPRAY COATING

(75) Inventor: Paul Edward Jarvis, Preston (GB)

(73) Assignee: BAE Systems PLC, London (GB)

( * ) Notice: Subject to any disclaimer, the term of this patent is extended or adjusted under 35 U.S.C. 154(b) by 1108 days.

(21) Appl. No.: 10/512,692

(22) PCT Filed: Aug. 4, 2004

(86) PCT No.: PCT/GB2004/003378

§ 371 (c)(1),
(2), (4) Date: Oct. 27, 2004

(87) PCT Pub. No.: WO2005/018813

PCT Pub. Date: Mar. 3, 2005

(65) Prior Publication Data

US 2005/0218245 A1    Oct. 6, 2005

(30) Foreign Application Priority Data

Aug. 21, 2003  (EP)  ................................. 03255171
Aug. 21, 2003  (GB)  ................................. 0319630.0

(51) Int. Cl.
*C23C 16/52* (2006.01)
*A01G 27/00* (2006.01)

(52) U.S. Cl. .................. 427/8; 427/9; 239/67; 239/68; 239/69; 219/109; 73/602; 118/323; 118/663; 118/665; 118/679; 118/681; 118/682; 118/712; 118/713; 118/695; 118/669; 118/671

(58) Field of Classification Search .............. 427/8, 427/9; 239/67, 68, 69; 219/109; 73/602; 118/323, 663, 665, 679, 680, 681, 682, 712, 118/713, 695, 669, 671
See application file for complete search history.

(56) References Cited

U.S. PATENT DOCUMENTS

| | | | | |
|---|---|---|---|---|
| 4,358,471 A | * | 11/1982 | Derkacs et al. | ................. 427/9 |
| 5,793,011 A | * | 8/1998 | Watanabe et al. | ........... 219/109 |
| 5,941,463 A | * | 8/1999 | Herstek et al. | ........... 239/587.1 |
| 6,067,509 A | | 5/2000 | Gaiski | |
| 6,282,962 B1 | * | 9/2001 | Koch et al. | .................... 73/602 |
| 6,484,121 B1 | | 11/2002 | Filev et al. | |
| 2003/0101933 A1 | | 6/2003 | Filev et al. | |
| 2004/0062419 A1 | * | 4/2004 | Roh et al. | ................... 382/104 |

FOREIGN PATENT DOCUMENTS

DE      101 38 167 A1     2/2003

* cited by examiner

*Primary Examiner*—Nadine G Norton
*Assistant Examiner*—Mahmoud Dahimene
(74) *Attorney, Agent, or Firm*—Buchanan Ingersoll & Rooney PC

(57) ABSTRACT

A spray coating apparatus comprises a spray gun (12) operable to deposit a sprayed coating via a spray nozzle (18) onto a surface, a mapping means (22) associated with the spray gun (12) operable to ascertain and store topographical characteristics of the surface, a position sensor (28) operable to ascertain the position of the spray gun (12) relative to the surface, a coating thickness monitor (26) operable to ascertain the thickness of a coating applied to the surface, and a nozzle control means (24) operable to control the deposition of the sprayed coating, wherein the nozzle control means (24), in use, control the deposition of the sprayed coating in response to information provided by the position sensor (28), the coating thickness monitor (26) and the mapping means (22).

20 Claims, 3 Drawing Sheets

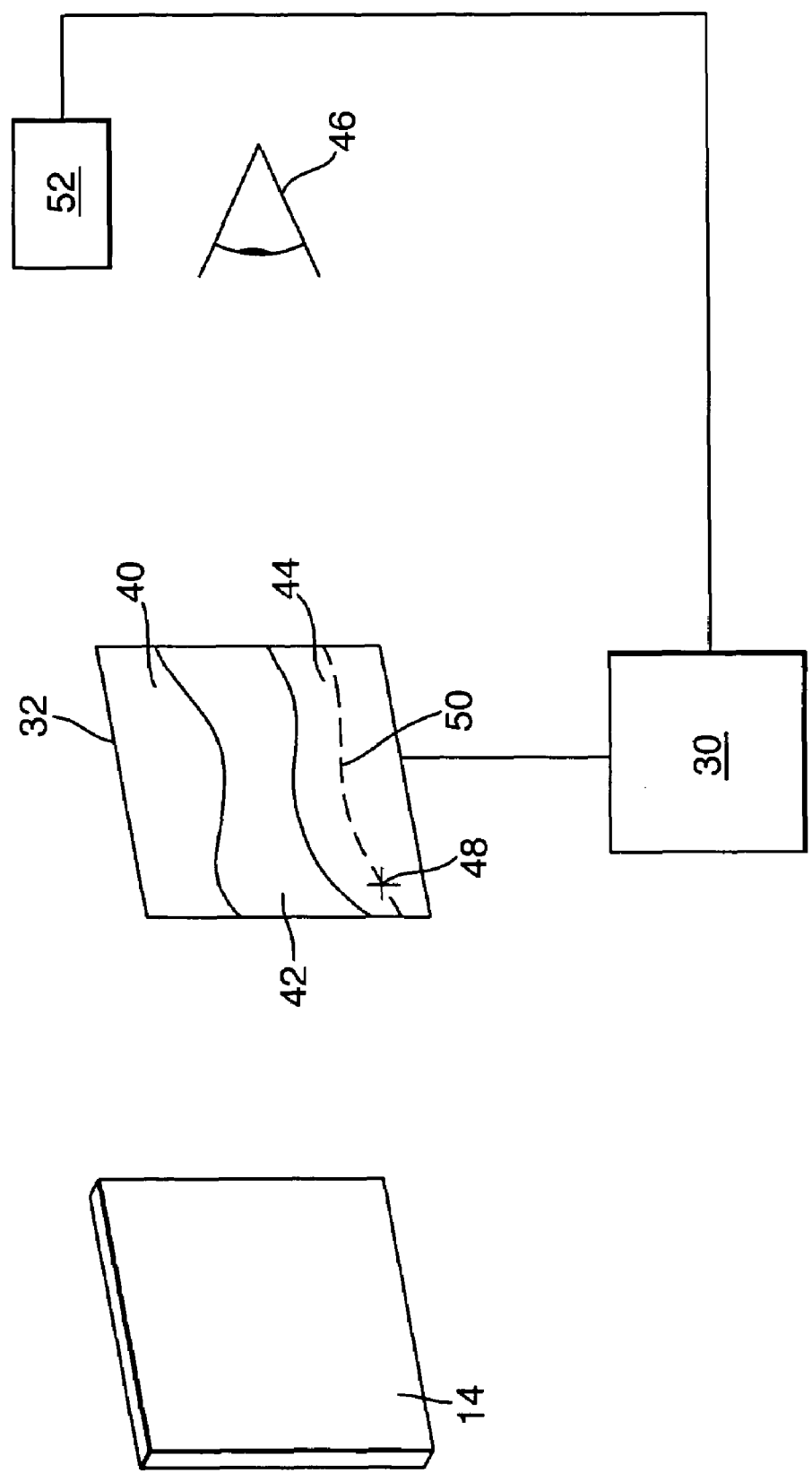

SPRAY COATING

The present invention relates to the application of a spray coating to a surface and in particular to the application of a spray coating to a surface of an aircraft structure.

It has long been known to apply coatings such as paint and lacquer to the exterior surface of an aircraft with a spraying apparatus. The use of such an apparatus ensures that relatively thin layers of paint or lacquer, having substantially uniform thickness, can be applied to the aircraft. The best results are achieved when the spray coating is applied manually, however it can take many years for an operator to accrue the necessary skills and experience to become truly proficient. While a skilled operator may be able to apply sprayed layers of substantially uniform thickness, it will be appreciated that there will exist portions of the layer which are locally thicker or thinner than the majority of the layer.

Taking the example of a large commercial aircraft, many tens of kilograms of paint are required to paint the exterior thereof and a lack of uniformity in the coating thickness can subsequently lead to problems. Areas of increased thickness can increase the overall weight of the painted aircraft thereby leading to a reduction in fuel efficiency, in use. Said areas of increased thickness may also lead to subtle changes to the aerodynamic characteristics of the surface to which the coating is applied. Areas of reduced thickness on the other hand may be susceptible to abrasion due to the impingement of in-flight airflow.

A further problem exists in the application of a second or subsequent coat of material having a uniform colour or appearance to a large expanse of work surface, for example an aircraft wing. While it may be relatively straightforward to observe the application of a first coat of material to a bare metal or primed work surface, it may be difficult to observe the coverage of subsequent coats, especially where the first coats retains a high sheen surface and/or ambient lighting conditions are less than ideal.

According to a first aspect of the present invention there is provided a spray coating apparatus, the apparatus comprising a spray gun operable to deposit a sprayed coating via a spray nozzle onto a surface, a mapping means associated with the spray gun operable to ascertain and store topographical characteristics of the surface, a position sensor operable to ascertain the position of the spray gun relative to the surface, a coating thickness monitor operable to ascertain the thickness of a coating applied to the surface, and a nozzle control means operable to control the deposition of the sprayed coating, wherein the nozzle control means, in use, control the deposition of the sprayed coating in response to information provided by the position sensor, the coating thickness monitor and the mapping means.

In a preferred embodiment the mapping means include an image projection means and an image recognition means. The image projection means may be mounted on the spray gun and comprise a laser projection means. The image recognition means may include a charge coupled device operable to view an image projected onto the surface by the projection means and to store characteristics of the projected image. In an alternative embodiment the mapping means may comprise a memory within which there is provided a model of the surface. In such an embodiment the model may be derived from a computer aided design (CAD) file of a member or component having the surface to be spray coated.

The position sensor means are associated with the spray gun so as to be able to determine the spatial position of the spray gun relative to the surface. The position sensor is operable to determine the distance of the spray gun from the surface, the attitude of the spray gun relative to the surface. During movement of the spray gun over the surface the position sensor may advantageously determine the direction, speed and acceleration characteristics of such movement.

The coating thickness monitor may comprise an optical means operable to determine the distance of the spray gun from the work surface both before and after a coating layer has been deposited. In an alternative embodiment the coating thickness may be determined by calculation from measurements taken from the spray gun, in use. Such measurements may include, for example, the mass flow rate of coating material passing through the nozzle, the transit speed of the spray gun over the surface, the shape and configuration of the spray cone emanating from the nozzle. In a further embodiment the coating thickness monitor may be acoustic, for example ultrasonic. In yet a further embodiment the coating thickness monitor may utilise laser scanning radar.

The nozzle control means may be operable to move the nozzle relative to the spray gun. In such an embodiment the nozzle may be tiltable relative to the body of the spray gun. By tilting the nozzle in his manner the nozzle controller may mitigate the effect of an operator moving the spray gun over the surface at a speed which differs from a required speed by tilting the nozzle. The nozzle may be tilted such that it points slightly ahead of the direction of movement of the spray gun when it is determined that the gun is being moved too slowly. Alternatively the nozzle may be tilted slightly behind the direction of movement when it is determined that the gun is being moved too quickly. The nozzle controller may further be operable to vary the floret of coating material through the nozzle. In such an embodiment the flow rate may be reduced when it is determined that the nozzle is directed towards a portion of the surface which already has a sufficiently thick layer of the spray coating. The nozzle controller may also be operable to vary the characteristics of a spray cone emanating from the nozzle. The nozzle may be movable, relative to the spray gun, in a plane substantially parallel to the surface to be sprayed; this allows the spray pattern to be moved so as to compensate for slight mispositioning or displacement of the gun. Similarly, the nozzle may be movable perpendicularly to the surface to be sprayed.

The system may additionally be provided with a display means operable to indicate to an operator of the system the deposition of the spray coating on the surface. The display means may comprise a screen provided in the field of vision of the operator. Such a screen may be mounted in a protective visor worn by the operator. In a preferred embodiment the screen is arranged such that the operator may view the actual work piece therethrough and the information displayed thereon is superimposed onto the actual work piece. The information for the display is provided by the mapping means, the position sensor and the coating thickness monitor. The display may be configured to show variations in the coating thickness as a function of colour. The display can thus indicate to an operator whether or not there exist portions of the surface which require additional coating to be applied. Information from the spray gun position sensor may be utilised to indicate on the screen the position of the spray gun relative to the surface. The screen may further include an indication of an intended path along which the spray gun is to be moved, with the nozzle movements referred to above compensating for minor positioning errors in the operator's arm movements compared to the indicated path.

According to a second aspect of the present invention there is provided a method of applying a sprayed coating to a work surface comprising the steps of:

providing a spray gun operable to deposit a sprayed coating via a spray nozzle onto a surface, the spray gun including a mapping means associated with the spray gun operable to ascertain and store topographical characteristics of the surface, a position sensor operable to ascertain the position of the spray gun relative to the surface, a coating thickness monitor operable to ascertain the thickness of a coating applied to the surface, and a nozzle control means operable to control the deposition of the sprayed coating;

ascertaining and storing topographical characteristics of the surface;

operating the spray gun to deposit a sprayed coating on to the surface while monitoring the position of the spray gun relative to the surface with the position sensor and the thickness of the coating applied to the surface with the coating thickness monitor; and controlling the deposition of the sprayed coating via the nozzle control means in response to information provided by the position sensor, the coating thickness monitor and the mapping means.

The step of ascertaining and storing the topographical characteristics of the surface may comprise the steps of illuminating the surface with an illumination source provided on the spray gun and viewing the illuminated surface with an optical recognition means while moving the spray gun over the surface. In an alternative embodiment the step of ascertaining and storing the topographical characteristics of the surface may comprise the step of entering a computer model of the surface into the mapping means. In an alternative embodiment the step may comprise scanning the surface with a measuring system, such as a laser scanner.

The step of monitoring the thickness of the coating may comprise measuring the distance of the spray gun from the surface both before and after the application of the coating thereto. In an alternative embodiment the thickness of the coating may be determined by calculation from observation of the operative state of the spray gun during a spraying operation. In yet a further embodiment the thickness of the applied coating may be determined using ultrasonic means.

The step of controlling the deposition of the sprayed coating via the spray nozzle may include moving the spray nozzle relative to the spray gun. Additionally the flow rate of material through the nozzle and the characteristics of the spray cone generated by the nozzle may be varied.

The method may include the additional step of providing a visual indication of the coverage of the sprayed coating on the surface to an operator of the spray gun.

An embodiment of the present invention will now be described with reference to the accompanying drawings in which:

FIG. 3 shows a schematic representation of a coating visualisation aspect of the present invention.

Figure 1:
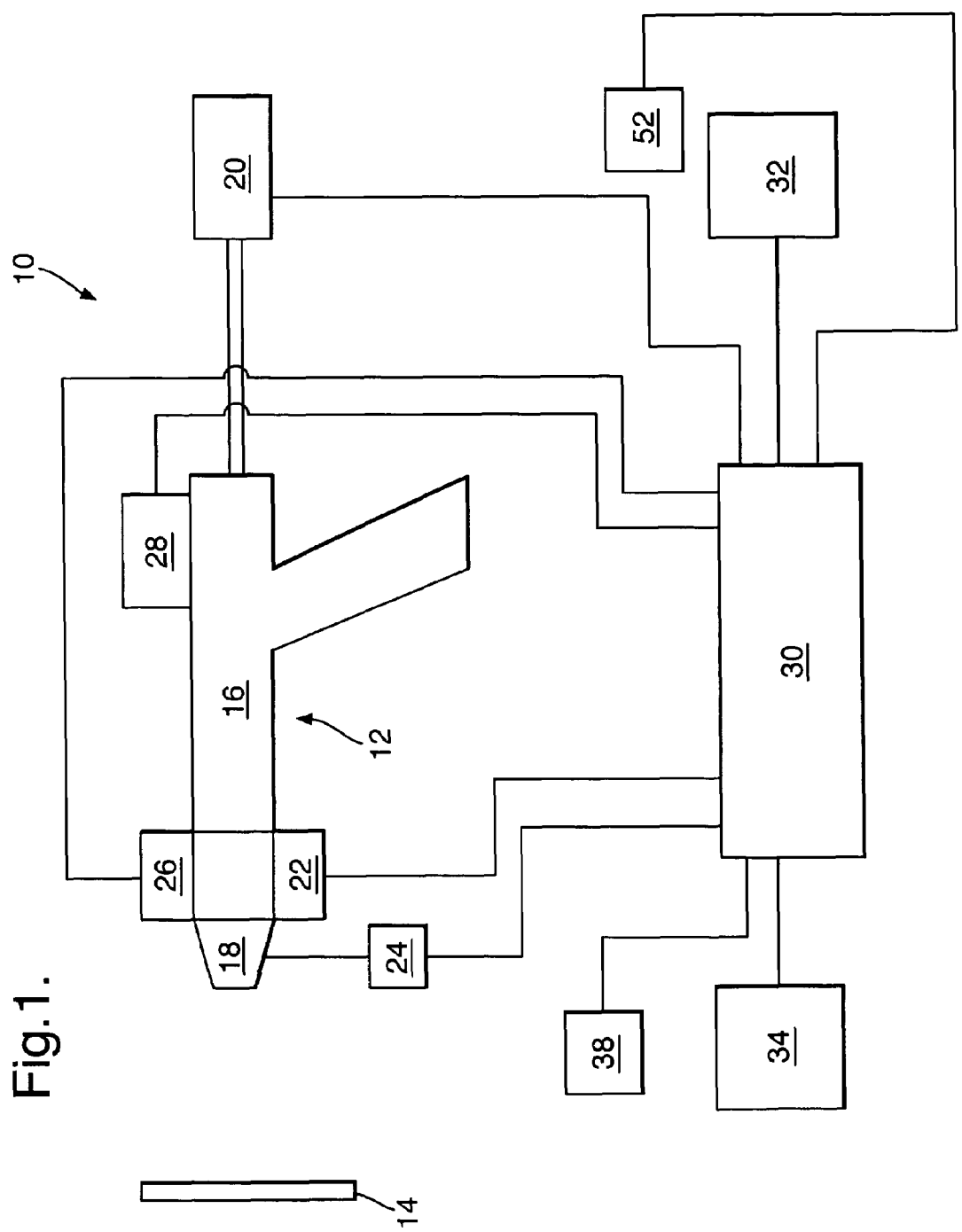
FIG. 1 shows a schematic representation of a spray coating application system according to the present invention.

Referring firstly to FIG. 1 there is shown a schematic representation of a spray coating system generally designated 10. The system comprises a spray gun 12 operable to apply a coating to a work piece 14. The spray gun 12 comprises a body 16 having a spray nozzle 18. Connected to the body 16 is a reservoir 20 of the material to be applied to the work piece 14, together with the means to deliver the material to the work piece, typically compressed air. The reservoir 20 is shown as a single item for the sake of simplicity however it will be understood that the spray gun 12 may typically be configured so as to be provided with separate coating material and compressed air feeds.

The spray gun 12 is further provided with a mapping means 22 to asses the surface topography of the work piece 14, a nozzle controller 24 operable to control the configuration of the nozzle 18, a coating thickness monitor 26 operable to measure the thickness of the coating applied to the work piece 14 by the spray gun 12, and a position sensor 28 operable to determine the position and attitude of the spray gun relative to the workplace 14. The mapping means 22, nozzle controller 24, coating thickness monitor 26 and position sensor 28 are linked via appropriate connection means to a control module 30. The control module 30 in turn is connected to a display means 32 which will be described in greater detail below. An ambient condition measurement means 34 is further provided to supply information to the control module regarding, for example, ambient temperature, humidity and barometric pressure. A further information feed is provided to the control module 30 from the reservoir 20 so as to provide information related to the condition of coating material and its method of delivery.

Figure 2A:
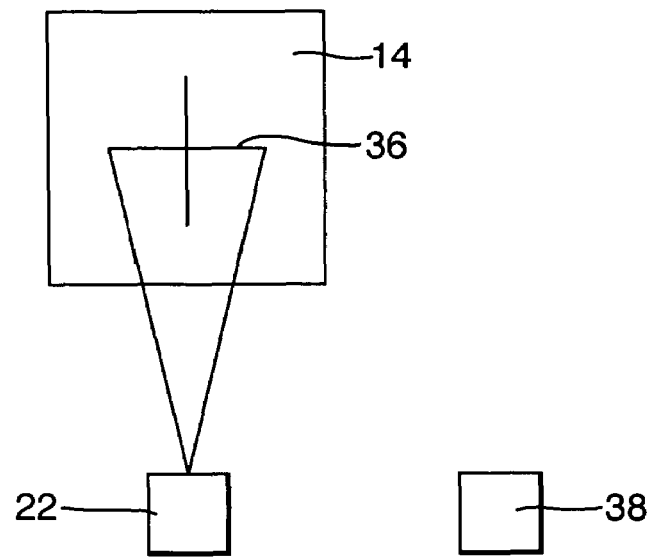
FIGS. 2a and 2b show diagrammatic representations of a work piece position and orientation aspect of the present invention

Operation of the system 10 will now be described. Before an initial coating can be applied to the work piece 14 a map of the work piece 14, including the position of the edges thereof in free space and the surface topography, must be created and stored in the control module 30. In the embodiment shown the map is created from information supplied from the mapping means 22 and the position sensor 28. The mapping means 22 is provided with a laser which is operable to illuminate the work piece 14 with an image of known shape. Referring now to FIG. 2a there is shown an example of a projected image 36 in the shape of a cross having arms of equal length. When the mapping means 22 is provided perpendicular to a flat portion of the work piece 14 and a known distance therefrom, then the projected image 36 of the cross is of determinable size. This image can be observed for the purposes of data recordal by an optical device 38, such as a CCD camera, located remotely from the spray gun 12.

Figure 2B:
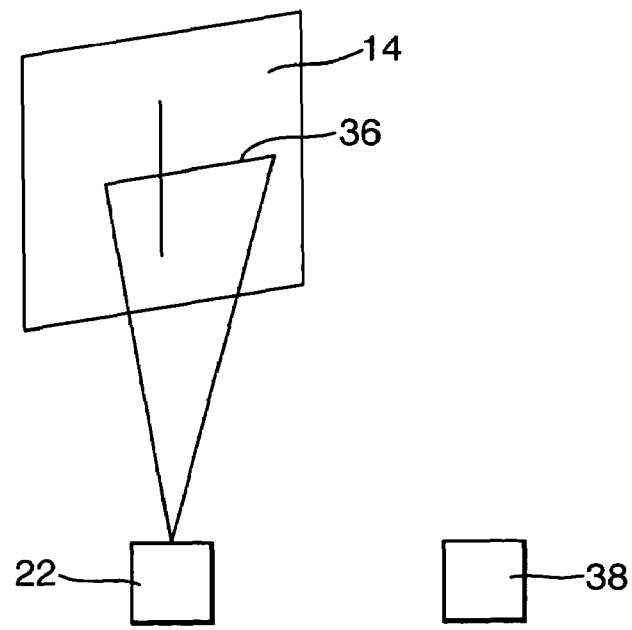

It will be appreciated that movement of the spray gun 12, i.e. towards and away from the work piece 14 and/or pitch, roll and yaw relative to the workpiece 14, will result in distortion of the image 36, as will changes in the contour of the work piece 14 beneath the image 36. FIG. 2b shows an example of the distortion of the projected image when the spray gun 12 is tilted from the perpendicular. In use, once a reference image has been established at a reference position of the spray gun 12 relative to the work piece 14, the spray gun 12 is then moved over the work piece 14 in an organised fashion. Typically the spray gun will be moved in a manner similar to that used when spraying, which is to say a plurality of sweeps over the work piece 14. Depending upon the nature of the task to be undertaken this movement may be effected by an operator or an appropriately configured robotic device. As the spray gun 12 is moved in this manner, information from the optical device 38 regarding the shape of the projected image 36 and from the position sensor regarding the position of the spray gun 12 is supplied to the control module 30. The control module 30 utilises this information to assemble the map of the work piece 14. The control module may advantageously be provided with means to confirm that the mapping operation has been successful.

Once the map has been created then the spray application of material to the work piece 14 may commence. Taking the example of the spray gun 12 being operated by a human operator, then a coating application may be commenced in a conventional manner with the operator causing material to be supplied to the nozzle 18 while translating the spray gun 12 over the work piece 14 in the sweeping manner described above. Operation of the spray gun 12 may however be modified as will be subsequently described. As noted above, the spray gun 12 is provided with a coating thickness monitor 26 operable to ascertain the thickness of the coating applied to the work piece 14. In the embodiment shown the monitor 26 comprises a laser source which is configured so as to determine the distance of the work piece surface from the spray gun 12 both before and after the application of a coating. The thickness of the coating can be calculated by subtraction and this information supplied to the control module 30 to update the work piece map stored therein. As the measured coating thickness is that of a wet coating, the control module 30 may be provided with sufficient information to correct the measured coating thickness to take into account drying thereof, for example by the evaporation of solvents.

The spray gun 12 is further provided with a nozzle controller 24, the operation of which will now be described. The spray nozzle 18 may be configured so as to emit a spray cone having a foot print with a circular, elliptical or figure of eight pattern. It will be understood that the density of material emitted from the nozzle 18 is greatest in the centre of the cone and decreases towards the edge thereof. One of the skills acquired by an experienced operator is to judge the overlap between successive passes of the spray gun 12 so as to ensure a coating layer of substantially uniform thickness is applied to a work piece 14. The nozzle controller 24 is operable in response to instructions received from the control module 30 to vary the operating characteristics of the nozzle 18 so as to achieve a comparable effect to that of an experienced operator. The nozzle 18 may be movable relative to the spray gun body 16, for example it may be tiltable about axes perpendicular to the longitudinal axis of the spray gun body 16 and/or it may be movable along and/or perpendicular to the longitudinal axis of the spray gun body 16. Additionally the controller 24 may be operable to alter the shape of the spray cone and/or alter the flow rate of coating material passing through the spray nozzle 18.

Taking the example of a first application of a coating to a surface, the controller 24 is operable to alter the operating characteristics of the spray nozzle 18 to take into account discrepancies in the movement of the spray gun 12 over the work piece 14. For a given spray cone shape and coating material flow rate there will exist an optimum work piece traversal speed and spacing of the spray gun 12 to ensure that a coating of a given thickness is deposited. It is possible that an operator may, during the course of a spraying operation, traverse the spray gun 12 at a speed different to that required for optimum coverage. In response to information received from the position sensor 28 and the coating thickness monitor 26, the control module 30 may instruct the nozzle controller 24 to vary the operating characteristics of the nozzle 18 accordingly to ensure that the required coating thickness is deposited.

In the case where second or subsequent coatings are applied to the work piece 14, the control module 30 will, as described above, contain a map including information related to the thickness of the previously applied coat or coats. By knowing the variation of coating thickness across the work piece 14 and the relative position of the spray gun 12 from the information supplied by the position sensor 28, the control module 30 can modify the operation of the nozzle 18 to apply more or less coating as required.

An additional feature of the present invention is the ability of information stored in the control module 30 to be supplied to an operator of the system 10. As has been described above, the control module 30 contains a map of the work piece 14 which, after application of the coating layer, is updated with information relating to the thickness of the coating on the work piece 14. This information can be converted into a visual representation and displayed on a display means 32 visible to the operator. Due to the aerosol nature of the coating during application to the work piece 14, a spray gun operator will typically be required to wear a respirator and visor. The visual representation may be displayed within the visor on, for example, a screen positioned in or near the operator's line of vision. Referring now to FIG. 3 there is shown a schematic representation of such a system. The control module 30 supplies information relating to the state of the coating present on the work piece 14 to a display means comprising a screen 32. The screen 32 is transparent allowing the work piece 14 to be viewed therethrough. The coating information therefore appears to the eye 46 of the operator to be overlying the work piece. The state of the coating may be represented by differing colours on the screen 32 with a fully coated portion 40 being represented by a first colour, a partially coated portion 42 in a second colour and an uncoated portion 44 in a third colour. The visor within which the screen is positioned is advantageously provided with a position sensor 52 of the type utilised by the spray gun 12 in order that the operator's position relative to the work piece 14 and line of sight can be ascertained and the display on the screen 32 tailored accordingly.

Depending upon the job being undertaken and the preferences of the operator, the coating information may be updated on the screen 32 in as an instantaneous manner is possible or, alternatively at the end of a particular spraying operation. Given that the system 10 monitors the position of the spray gun 12 relative to the work piece 14 via the position sensor 28, then the control module 30 may indicate the position of the spray gun 12 on the screen 32, for example in the form of a cross-hair icon 48. It will be understood that such a feature would help with the aiming of the spray gun 12 when resuming a spraying operation which has been interrupted. The control module 30 may further be operable to represent on the screen 32 a suggested path 50 for the spray gun 12 to follow.

While the above described display feature has been described with reference to a spray gun having an actively controlled spray nozzle, it will be appreciated that it may be equally applicable to a conventional spray gun with a fixed, i.e. non actively controlled, nozzle. Such a spray gun would however require the above described mapping means, position sensor and coating thickness monitor in order to generate sufficient information for the display means.

It will be appreciated that the present invention seeks to provide a spray coating system which may be used by a semi-skilled operator or automated means such as an industrial robot and which system is operable to compensate for problems inherent with the use of such means. As described above the system may intervene in the deposition of the coating to ensure a uniform application thereof. An operator may be provided with a visual display showing the state of the coating and drawing to their attention areas of overspray and underspray.

Those skilled in the art will appreciate that there are alternatives to features of the embodiments described above. For example, the map of the workpiece may be created using ultrasound and three detectors. The positioning of the spray gun and its orientation may be effected through the use of laser in combination with a GPS system in the spray shop. Means may be provided to mix the paint or coating at the head of the spray gun "on the fly", to cater for changes in the local environmental conditions.

The invention claimed is:

1. A spray coating apparatus comprising:
   a spray gun moveable relative to a surface and operable to deposit a sprayed coating via a spray nozzle onto the surface,
   a mapping apparatus associated with the spray gun and including both an image projection device which in operation projects an image onto the surface and an image recognition device that views the image projected onto the surface, and ascertains topographical characteristics of the surface from the size and shape of the image, and that stores said characteristics;
   a position sensor operable to ascertain the position of the spray gun relative to the surface,
   a coating thickness monitor operable to ascertain the thickness of a coating applied to the surface while the coating is being deposited, and
   a nozzle controller that controls deposition of the sprayed coating, wherein the nozzle controller controls the deposition of the sprayed coating in response to information provided by the position sensor, the coating thickness monitor and the mapping apparatus.

2. The apparatus as claimed in claim 1, wherein the image projection device is mounted on the spray gun.

3. The apparatus as claimed in claim 1 wherein the coating thickness monitor comprises an optical means operable to determine the distance of the spray gun from the work surface both before and after a coating layer has been deposited.

4. The apparatus as claimed in claim 1 wherein the coating thickness is determined by calculation from measurements taken from the spray gun, in use.

5. The apparatus as claimed in claim 1 wherein the coating thickness monitor is acoustic.

6. The apparatus as claimed in claim 1 wherein the nozzle controller is operable to move the nozzle relative to the spray gun.

7. The apparatus as claimed in claim 1 wherein the nozzle controller is operable to vary the flow rate of coating material through the nozzle.

8. The apparatus as claimed in claim 1 wherein the nozzle controller is operable to vary the characteristics of a spray cone emanating from the nozzle.

9. The apparatus as claimed in claim 1, the apparatus further including a display device operable to indicate to an operator of the system the deposition of the spray coating on the surface.

10. The apparatus as claimed in claim 9 wherein the display device comprises a screen provided in the field of vision of the operator.

11. The apparatus as claimed in claim 10 wherein the screen is mounted in a protective visor worn by the operator.

12. The apparatus as claimed in claim 10 wherein the screen is arranged such that the operator may view the actual work piece therethrough and the information displayed thereon is superimposed onto the actual work piece.

13. A method of applying a sprayed coating to a work surface comprising:
   providing a spray gun moveable relative to a surface and operable to deposit a sprayed coating via a spray nozzle onto a surface, the spray gun including a mapping apparatus associated with the spray gun for ascertains and stores topographical characteristics of the surface, a position sensor operable to ascertain the position of the spray gun relative to the surface, a coating thickness monitor operable to ascertain the thickness of a coating applied to the surface while the coating is being deposited, and a nozzle controller that controls the deposition of the sprayed coating;
   ascertaining and storing topographical characteristics of the surface by projecting an image onto the surface by an illumination source provided on the spray gun and viewing the size and shape of the projected image with an image recognition device while moving the spray gun over the surface;
   operating the spray gun to deposit a sprayed coating on to the surface while monitoring the position of the spray gun relative to the surface with the position sensor and the thickness of the coating applied to the surface with the coating thickness monitor; and
   controlling the deposition of the sprayed coating via the nozzle controller in response to information provided by the position sensor, the coating thickness monitor and the mapping means.

14. The method as claimed in claim 13 wherein the ascertaining and storing the topographical characteristics of the surface comprises entering a computer model of the surface into the mapping apparatus.

15. The method as claimed in claim 13 wherein monitoring the thickness of the coating comprises measuring the distance of the spray gun from the surface both before and after the application of the coating thereto.

16. The method as claimed in claim 13 wherein monitoring the thickness of the coating is determined by calculation from observation of the operative state of the spray gun during a spraying operation.

17. The method as claimed in claim 13 wherein controlling the deposition of the sprayed coating via the spray nozzle includes moving the spray nozzle relative to the spray gun.

18. The method as claimed in claim 13 wherein controlling the deposition of the sprayed coating via the spray nozzle includes varying the flow rate of coating material through the nozzle 19. The method as claimed in claim 13 wherein controlling the deposition of the sprayed coating via the spray nozzle includes varying the characteristics of the spray cone generated by the nozzle.

20. The method as claimed in claim 13, the method including providing a visual indication of the coverage of the sprayed coating on the surface to an operator of the spray gun.

* * * * *